No. 730,270. PATENTED JUNE 9, 1903.
T. W. KIRKMAN.
SCALE.
APPLICATION FILED MAY 27, 1902.
NO MODEL. 3 SHEETS—SHEET 3.
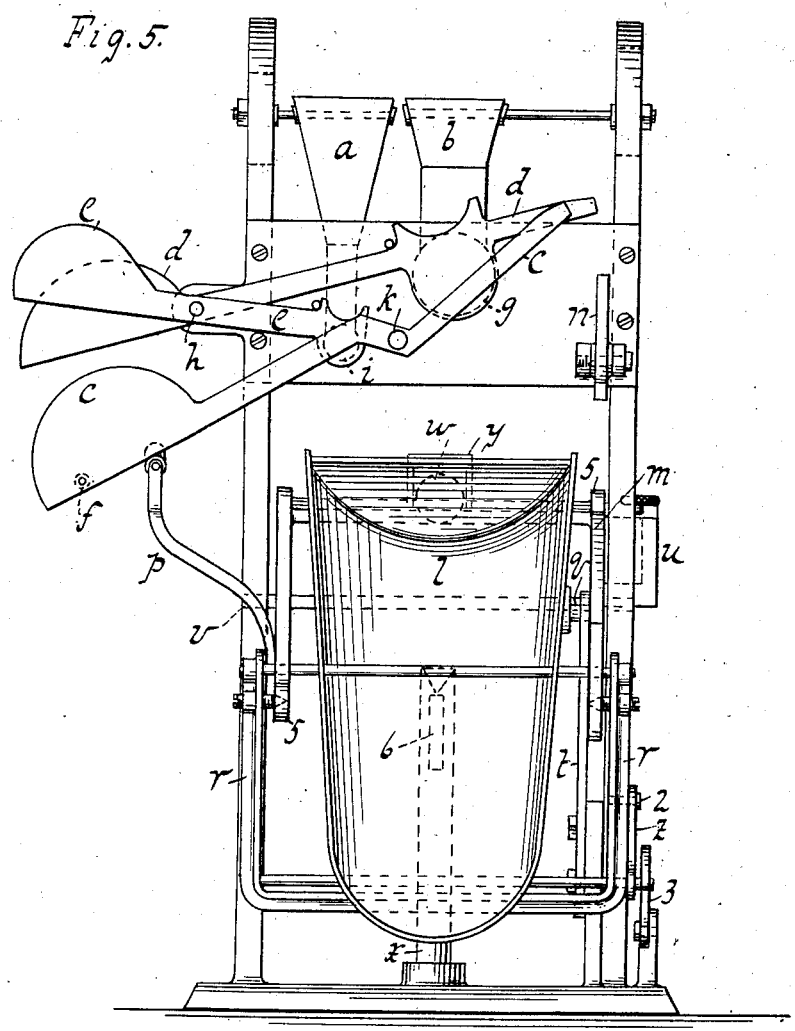
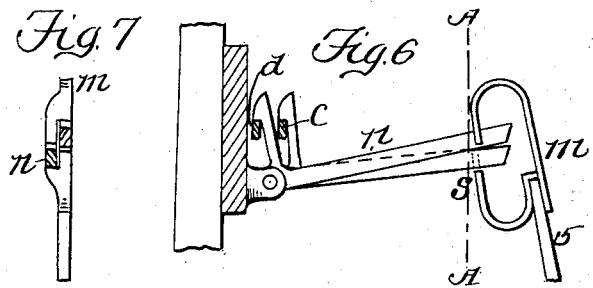
WITNESSES:
William Miller
Chas. E. Reusgen
INVENTOR
Thomas W. Kirkman
BY
W. C. Hauff
ATTORNEY No. 730,270.

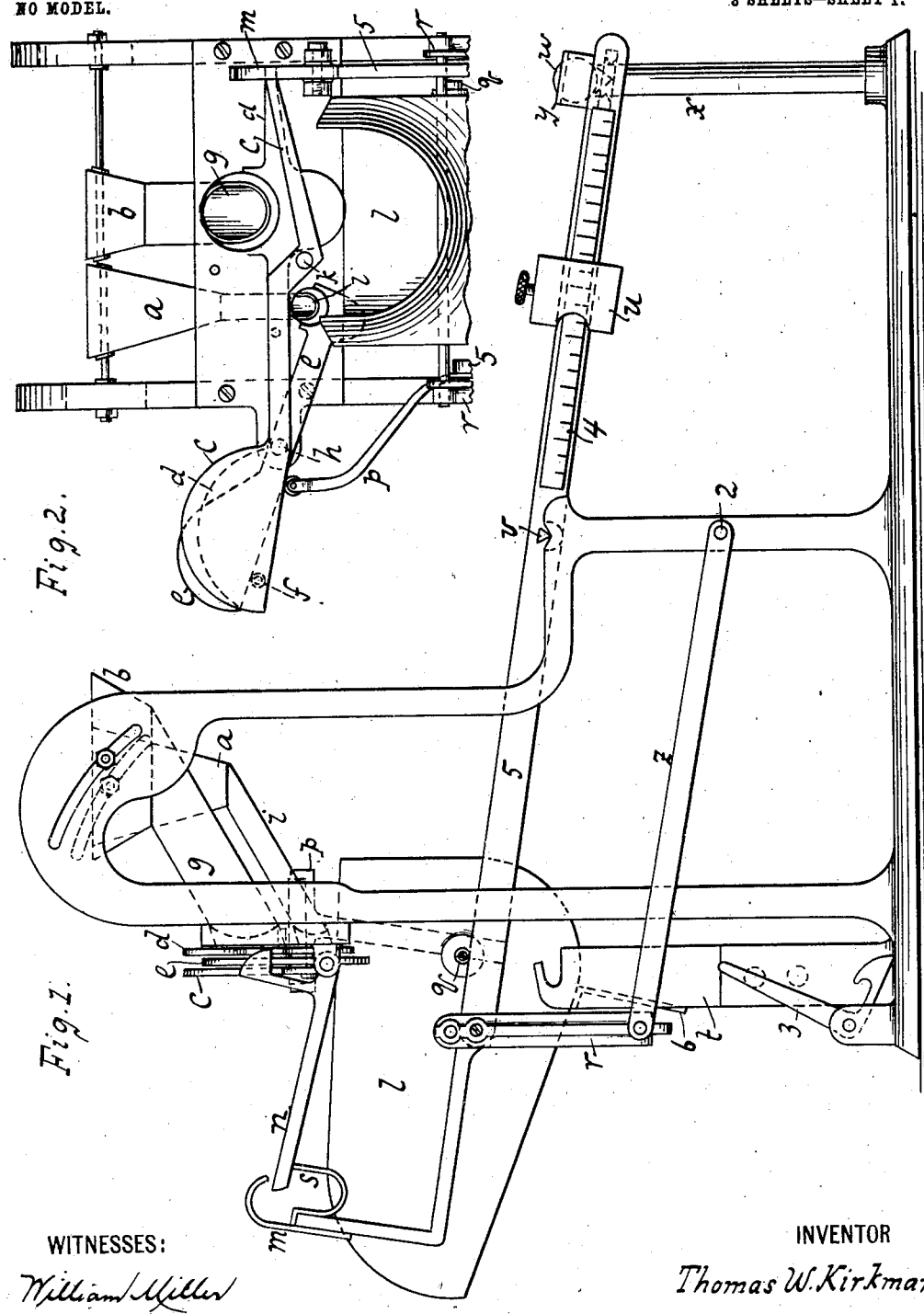

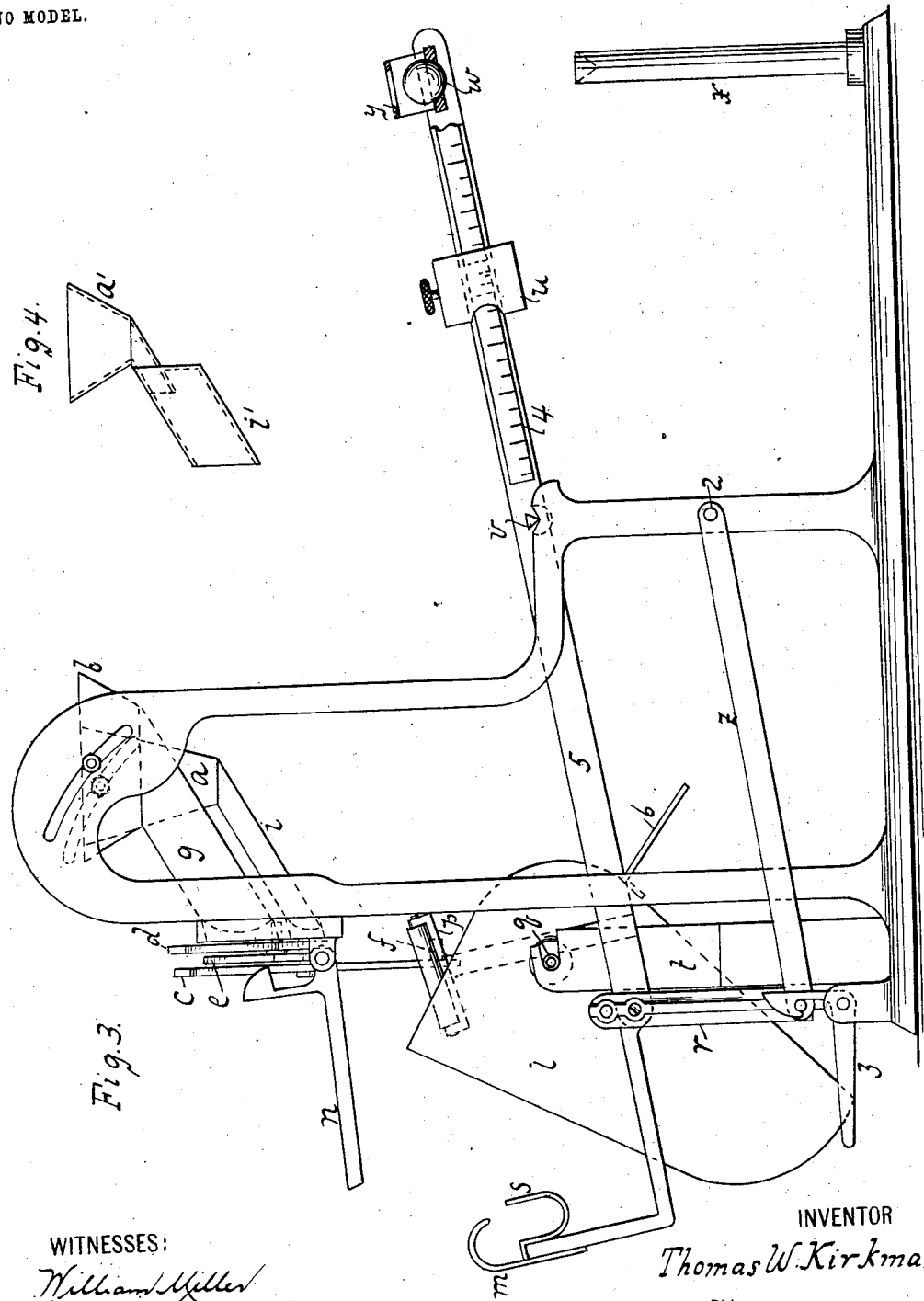

Patented June 9, 1903.

UNITED STATES PATENT OFFICE.

THOMAS W. KIRKMAN, OF NEW YORK, N. Y.

SCALE.

SPECIFICATION forming part of Letters Patent No. 730,270, dated June 9, 1903.

Application filed May 27, 1902. Serial No. 109,229. (No model.)

*To all whom it may concern:*

Be it known that I, THOMAS W. KIRKMAN, a citizen of the United States, residing in Manhattan borough, New York city, in the county and State of New York, have invented new and useful Improvements in Scales, of which the following is a specification.

This invention relates to a device which is serviceable for automatically weighing sub10 stances such as grain, coffee, and other material.

The device is illustrated in form of what is generally known as a "beam-scale" and arranged to operate continuously and automat15 ically, weighing and discharging a determined charge or load at each oscillation.

The invention resides in certain novel features of construction set forth in the following specification and claims and illustrated in the annexed drawings, in which—

Figure 1 is a side elevation of a scale embodying this invention, the bucket being raised or ready to be charged. Fig. 2 is a front elevation of Fig. 1. Fig. 3 is a view like Fig. 1, showing the bucket dumping or discharging its load or weight. Fig. 4 shows a modification. Fig. 5 is a front elevation of Fig. 3. Fig. 6 shows a latch in two sections. Fig. 7 is a section along A A, Fig. 6.

In the drawings is shown a bucket or scalepan 1, which swings on scale beam or frame 5, having its fulcrum or knife-edge at $v$ and a weight at $u$. This weight can be fixed, if the scale is to work permanently, for uniform weight or measurement, or if changes are called for the weight can be made slidable or adjustable. A poise or stop weight $w$ is also shown, the function of which will more clearly appear later on. It may here be noted, how40 ever, that when the device is at the startingpoint, Fig. 1, or the bucket up and the weight end of beam 5 down, the poise-weight rests on a stem or support $x$ and is clear or away from the beam; but on the rise of this beam end the poise-weight lying in the path of the beam is taken by the latter and will momentarily arrest and then be carried up by the beam. The bucket is overweighted or so hung as to be normally in receiving position, Fig. 1—that is, so as to hold or retain material flowing or poured thereinto. The swing or tilt of the bucket on the beam, so as to dump or empty, takes place when the bucketcarrying end of the beam swings down or drops, Fig. 3, and the stud or roller $q$ of the bucket coming to or being arrested on the dumping-block $t$ will cause the mouth or front part of the bucket to dip or swing downward to dumping position or for discharging the bucket contents. The bucket while overweighted to normally rest in receiving position is prevented from swinging or elevating its mouth too far up or from swinging too far backward by a stop or arm 6, which when the bucket is in normal or receiving position is held to or comes to rest against a crosspiece or pivot-bar of link $r$, jointed to the bucket or to beam 5 and to another link or auxiliary beam $z$. The latter has a suitable bearing or brace-pivot 2. The feed of the bucket when suitably arranged is intermittent, so as to cease when the bucket is dumping, but to occur when the bucket is raised or in receiving position.

A chute or feed-hopper is shown at $a$ with mouth portion or tube $i$ and a gate or cut-off lever at $e$, fulcrumed at $h$. This lever $e$ has its inner end formed at the gate or cut-off proper adapted to come up or swing in front of or close the feed $a$ or to swing down or open the feed. The outer end portion of lever $e$ is enlarged or weighted, so that the gate normally tends to shut or swing to closing position. This gate-lever or its weight portion is adapted to rest on a stud or roller $f$ on what may be called an "auxiliary weightlever" $c$. This lever is fulcrumed at $k$ and also has its outer end portion enlarged or weighted and its inner or opposite end adapted to be engaged by a lock or latch $n$. When the auxiliary weight-lever is thus hooked or its weight end held up by the lock, the weight end of gate $e$ being also held up by stud $f$ on lever $c$ the gate portion of lever $e$ is held down or so as to leave hopper $a$ open for material to feed or flow into the bucket. Upon receiving its weight or charge the bucket and contents descend and the arm or hook $m$ of the beam unlocks the latch $n$ for the weight $c$ to drop. The support of this weight-lever $c$ now being removed from under gate-lever $e$, the latter closes. The weight $c$ in its descent also drops onto arm $p$ of the beam, which impact tends to depress the beam and upset the bucket or give the same a quick dump, the engagement of the bucket-stud $q$ with block or hook $t$ causing proper dumping movement. The bucket being empty, the scale-beam weight is sufficient to raise the same with arm $p$ and levers $c$ and $e$ for the gate to be opened, and, together with lever $c$, to be latched at $n$, when a second feed takes place, and so on.

In addition to latch-unlocking arm $n$ the beam carrying the bucket has a latch setting or locking arm $s$, which on the upward or return swing of the bucket will strike or move the latch to move or push it securely to engaging position for insuring firm hold of lever $c$ in case the latch should have but partly or insecurely taken hold. The bucket-carrying beam, in addition to its function as such, thus performs further duties, such as receiving on its arm or striking-face $p$ the dumping blow or impact of the falling weight $c$, and on its rise by means of said arm to sustain and lift or restore the weight $c$, as also to reopen gate $e$. Furthermore, by its arms $m$ and $s$ the bucket-beam moves the latch to both locking and unlocking position. The arm $s$ is practically given a certain degree of springiness or yielding.

The device can be locked or put out of action even when the hopper is still supplied with material. Say the bucket has dumped or is down, Fig. 3, then a hook or latch 3, made to engage link $r$ or a pin or suitable part at said link, can hold the bucket lowered, so that beam 5 will not rise and gate $e$ will remain shut to cut off the feed $a$.

Such parts as the gate and auxiliary or counterweight-lever can be readily cut or died from sheet metal, so as to swing in or occupy only a shallow or thin space or plane across the feed, and a sharp gate or closure can thus be practically formed for a neat or accurate cut off.

The gate or its upper edge is concaved or shaped to fit the tube or circular feed $a\ i$, so that when open this gate edge fits or conforms neatly to the tube and does not obstruct the outflow, while such gate on rising will cut through the material and rapidly or effectively close the tube.

The latch $n$ is formed as a lever with a hook and so fulcrumed or overweighted that it normally tends to swing or drop to unlocking or releasing position. The counterweight or gate when engaged by said hook tends to support such lever, so as to hold the latch in engaging position. Such sustaining hold of the counterweight or gate is obtained by placing the nose of the latch intermediate the fulcrum and the release-weight end.

An expeditious manner of working has been found by allowing the bucket at the start to be fed very rapidly until it has nearly the determined charge which is to be dumped and then allowing the bucket to drop part way until temporarily arrested by poise-weight $w$. The remainder of the charge is then allowed to flow slowly into the bucket, so as to avoid overcharge or overflow, and at the moment the correct weight has been received by the bucket the beam lifts the poise-weight off its supporting-stem $x$, the gate closes, and the weight $c$ falls to dump the bucket.

A manner of effecting a rapid followed by a slower feed, as seen in Fig. 4, is to have the feed or tube $i'$ of considerable diameter or such capacity as to hold about but not quite the amount required to balance or depress the bucket and to have the inlet or entrance $a'$ into this tube of small diameter or so as to fill or feed the tube with comparative slowness. While the gate $e$ is closed and the bucket is descending, dumping and returning or rising the inlet $a'$ will fill the feed $i'$, which now for the time acts as a storage vessel or reservoir. On the bucket being up or in receiving position and the gate $e$ opening this stored supply will, so to say, instantly empty or drop from this reservoir into the bucket and the continuous inflow from $a'$ will then continue more slowly to add to this supply in the bucket until the latter drops to free the latch $n$ and again close the gate, the supply from $a'$ thereupon again commencing to store the temporarily-closed feed $i'$.

Another method is to have two feeds, $a$ and $b$, of varying capacities, as seen in Figs. 1, 2, 3, and 5. The operation of feed $a\ i$, with its gate $e$ and weight or lever $c$, is already described. The gate or cut-off lever $d$ for feed $b$ can be fulcrumed at $h$ or in common with lever $e$. This gate $d$ normally closes by its weighted outer end tending to drop, and thus give a lift or cut-off swing or position to gate $d$ across the mouth part of feed or hopper $b$. The latch $n$, which, as described, holds open gate $e$, or rather its sustaining-lever $c$, is also made to engage the inner end of gate-lever $d$ to hold the same open. Said latch, however, is so constructed or the lever $d$ is so located as to be released by the latch somewhat in advance of the release of the lever $c$. When the bucket first starts to drop, say to the point of arrest by the counterpoise, the gate $d$ is unlocked to cut off the larger feed $b$. The gate $e$ being still left open will continue a slower feed of the bucket until such gate is also closed by the further or second drop of the bucket, moving the latch so far as also to release lever $c$. One way of arranging this successive closure of gates is to have the latch $n$ in two sections, one section for each gate, respectively, as indicated in Figs. 6 and 7, or to have the gate $d$ in a plane farther away from the bucket than the plane of movement of lever $c$, so that the latch common to both levers $d$ and $c$, when swung or moved away from the feeds, will clear lever $d$ while still overlapping or holding lever $c$.

It has been found that a smooth or reliable feed in which retarding or sticking of the material will not occur is obtained by making the feeding tube or tubes of glass or material which has no tendency to cause sticking or adherence of the material.

The beam at its rear end can be provided with a cage $y$ for retaining the poise-weight $w$ against loss and also prevent the rear end of the beam descending too far by the top of the cage being arrested against the poise-weight when brought to rest on support $x$.

What I claim as new, and desire to secure by Letters Patent, is—

1. An automatic scale comprising a beam and a bucket, a hopper, a cut-off, an auxiliary weight, and a latch or lock for the auxiliary weight, said beam being made to sustain or lift the auxiliary weight and to receive the stroke or weight of the same when released or free from the lock.

2. An automatic scale comprising a beam, a hopper, a cut-off, an auxiliary weight for sustaining the cut-off, a lock for the weight, and a bucket on the beam, the latter being adapted for receiving the load of the weight when free or unlocked and to restore the weight on the return of such beam.

3. A scale comprising a beam, hoppers, gates for the hoppers, a weight for sustaining one of the gates, a latch or lock for the other gate and for the weight, and a bucket on the beam the latter being adapted for sustaining the weight when free or unlocked.

4. A scale comprising a beam, a hopper, a gate therefor, a weight connected with the gate, a lock for the weight, a bucket on the beam, and means carried by the beam for sustaining the weight and actuating the lock.

5. A hopper, a cut-off at the hopper, a lock or latch to one side of the hopper, a weight for sustaining the cut-off, a bucket, and a beam, and arms connected with the beam for respectively sustaining the weight and for actuating the latch.

6. A hopper, a cut-off at the hopper, a lock or latch, a weight, a bucket and a beam for lifting the weight to engagement with the lock, said beam having arms for respectively moving the lock into and out of engaging position.

7. A hopper, a bucket adapted to be charged from the hopper, a cut-off for the hopper, a weight, and a lock or latch for the weight and cut-off, said lock being made to normally occupy or move to releasing position and said bucket being mounted on a beam having arms for respectively moving the lock to releasing and locking position.

8. A hopper, a swinging bucket for the hopper, a cut-off, a weight, and a lock or latch for the weight and cut-off, said bucket being mounted on a beam having an actuating-arm for the lock and being made to receive the blow of the weight when falling or released by the catch so that the beam will be swung down and the bucket dumped.

9. A bucket, a beam for carrying the bucket, a poise-weight for temporarily engaging or arresting the beam and bucket, a hopper and cut-offs for the bucket, an auxiliary weight, a lock or latch for the auxiliary weight and for one of the cut-offs, and an arm carried by the beam for actuating or freeing the latch to first close a cut-off and then to again actuate the latch to free the auxiliary weight to allow the latter to fall upon the beam.

10. A bucket and a scale-beam therefor, combined with a hopper, cut-offs for the hopper mounted on a common pivot or fulcrum, a weight having a fulcrum separate from that of the cut-offs and made to support one of the same, a lock or latch for the weight and the other cut-off, and mechanism for actuating the latch for first closing a cut-off and then to allow the weight to drop to close the other cut-off and depress the beam.

11. A bucket and a scale-beam, combined with a hopper and cut-off, a weight, a latch for the cut-off and weight actuated by the beam, and an arm on the beam made to adjust or open the cut-off and to act as a striking block or face to receive the impact of the weight when freed from the latch.

12. A scale-beam having a pivoted or swinging bucket overweighted so as to normally come to receiving or filling position and provided with a stop or arresting arm, a dumping-block in the path of the bucket to move the same to discharging or dump position, a link and a bar for connecting the same to the scale-beam, and a catch or hook for engaging the bar to hold the bucket in dumping position or prevent the same from returning for a subsequent charge.

13. In a scale, a bucket, a beam, a stop-weight carried by the beam, a feed for supplying the bucket, a feed cut-off opened by the beam, a latch actuated by the beam to suitably operate the cut-off, and a dumping-block arranged in the path of the bucket and adapted to empty it after the stop-weight has been overbalanced.

14. In combination, an overweighted bucket so as to normally rest in receiving position, a scale-beam suitably connected with said bucket, a feed and cut-off for intermittently supplying the bucket, a stop-weight carried by the beam, dumping mechanism for the bucket, a bar jointed to the beam, a link jointed to the bar, and a stop on the bucket adapted to be arrested by the said bar.

15. In a scale, a beam, an overweighted bucket carried thereby, said bucket normally lying in a filling position, a feed and cut-off for the bucket, a weight connected with the cut-off, means carried by the beam for supporting the weight, a lock for the cut-off, means carried by the beam for operating the lock, and dumping mechanism for the said bucket.

In testimony whereof I have hereunto set my hand in the presence of two subscribing witnesses.

THOMAS W. KIRKMAN.

Witnesses:
E. F. KASTENHUBER,
CHAS. E. POENSGEN.